United States Patent [19]

Mercier et al.

[11] Patent Number: 5,055,443
[45] Date of Patent: Oct. 8, 1991

[54] ATTRITION RESISTANT AGGLOMERATES OF ACTIVE ALUMINA

[75] Inventors: Marc Mercier, Ales; Marc Curcio, Salindres, both of France

[73] Assignee: Rhone-Poulenc Chimie, Courbevoie, France

[21] Appl. No.: 470,600

[22] Filed: Jan. 26, 1990

[30] Foreign Application Priority Data

Feb. 1, 1989 [FR] France ................................ 89 01264

[51] Int. Cl.$^5$ .............................................. B01J 32/00
[52] U.S. Cl. ..................................... 502/439; 423/628
[58] Field of Search ................. 502/439; 423/626, 628

[56] References Cited

U.S. PATENT DOCUMENTS 3,411,878 11/1968 Graulier et al. ................. 502/439 X
3,628,914 12/1971 Graulier .......................... 502/439 X
4,124,699 11/1978 Michel et al. ................... 502/439 X

FOREIGN PATENT DOCUMENTS 0055164 6/1982 France ................................ 502/439
1042158 9/1966 United Kingdom .

Primary Examiner—W. J. Shine
Attorney, Agent, or Firm—Burns, Doane, Swecker & Mathis

[57] ABSTRACT

Attrition resistant agglomerates of active alumina, i.e., agglomerates displaying an attrition resistance of less than 0.3% after aging for 24 hours at 980° C., are produced by establishing a batch of starting material active alumina agglomerates in a confining and protective treatment zone, such starting agglomerates having been impregnated with water or an aqueous acid solution and the confining treatment zone itself being enclosed within an autoclaving assembly as to provide an interspace between the internal wall surfaces of the autoclaving assembly and the exterior wall surfaces of the treatment zone, and hydrothermally treating such impregnated agglomerates at a temperature of at least 80° C. by directing a stream of a hot heat transfer fluid against the exterior wall surfaces of the treatment zone.

27 Claims, 2 Drawing Sheets

ATTRITION RESISTANT AGGLOMERATES OF ACTIVE ALUMINA

BACKGROUND OF THE INVENTION

1. Field of the Invention

The present invention relates to novel active alumina agglomerates, to a process for the production of these novel agglomerates and to a particular apparatus for carrying out such process.

This invention especially relates to the hydrothermal treatment of active alumina agglomerates.

2. Description of the Prior Art

Certain catalytic processes, such as heterogeneous catalysis, for example in the field of the treatment of crude oil fractions or the treatment of gaseous effluents, such as the exhaust gases emanating from internal combustion engines, require the use of catalyst supports having a high porosity, good mechanical properties, such as a high crushing strength and notable resistance to attrition.

Supports made of active alumina basically satisfy these requirements, especially after they have been hydrothermally treated. This treatment appreciably improves the mechanical properties of the resulting agglomerates.

Such hydrothermal treatment is known to this art and is described, for example, in FR 1,386,364, 1,449,904 and 2,496,631 and U.S. Pat. Nos. 3,628,914 and 3,480,389.

This hydrothermal treatment entails impregnating starting material alumina agglomerates with water or an aqueous acid solution, then heating the impregnated agglomerates in an autoclave to a temperature higher than 80° C.

The agglomerates treated in this manner are then dried and subjected to a heat treatment, or calcination, at a given temperature. This calcination temperature is selected as a function of the particular specific surface desired and the temperature of actual intended use of the supports.

SUMMARY OF THE INVENTION

A major object of the present invention is the provision of novel hydrothermally treated agglomerates of active alumina having improved mechanical properties, particularly a better resistance to attrition.

Another object of the present invention is the provision of a particular process for the preparation of such novel active alumina agglomerates comprising hydrothermally treating agglomerated starting material in an autoclave, and then drying and heat treating same under conditions as to impart a characteristic specific surface thereto.

Briefly, the present invention features a particular hydrothermal treatment comprising impregnating agglomerates of active alumina with water or an aqueous acid solution, introducing the impregnated agglomerates into a confining enclosure which itself is placed in an autoclave, and then heating the agglomerates to a temperature of at least 80° C. by means of a heat transfer fluid supplied to the interspace between the external walls of said enclosure and the internal walls of the autoclave.

DETAILED DESCRIPTION OF THE PREFERRED EMBODIMENTS OF THE INVENTION

Figure 1:
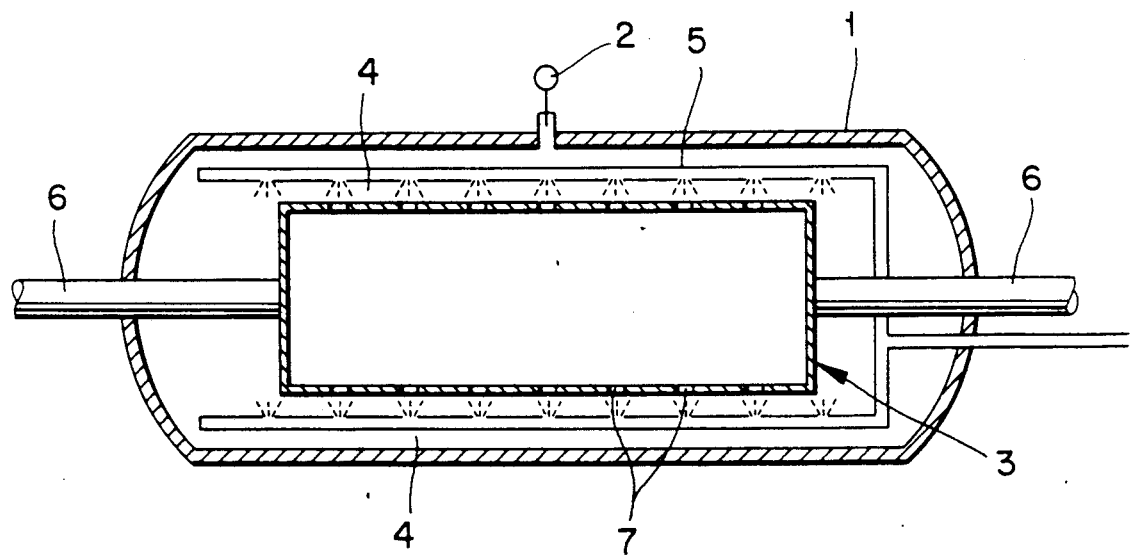
FIG. 1 is a front cross-sectional view of one embodiment of the apparatus for hydrothermally preparing the active alumina agglomerates of the invention.

More particularly according to the present invention, the heat transfer fluid is advantageously in the gaseous or vapor state and preferably is water vapor.

In this manner, the flow of the heat transfer fluid does not directly contact the agglomerates. While not wishing to be bound to any particular theory, this appears to enable production of final agglomerates having better mechanical properties.

In a preferred embodiment of the invention, the enclosure containing the alumina agglomerates is neither tight nor imperforate and advantageously includes a plurality of openings, thereby permitting the water of condensation to cascade down through the confined bed of agglomerates.

Advantageously, the enclosure is but partially filled with the alumina agglomerates. Indeed, in certain cases the hydrothermal treatment causes the agglomerates to expand.

In another preferred embodiment of the invention, the agglomerates are placed and maintained in a state of motion relative to each other, for example by moving the enclosure, advantageously by rotating same.

In another preferred embodiment of the invention, the enclosure is rotated about an essentially horizontal axis.

The starting material alumina agglomerates that are hydrothermally treated according to the process of the invention are agglomerates produced by forming, by any known process, the active alumina prepared, for example, from alumina gels and from the alumina obtained by dehydration of aluminum hydroxide.

The subject process is particularly applicable to agglomerates of active alumina produced by the rapid dehydration of an aluminum hydroxide, such as, for example, bayerite, hydrargillite or gibbsite, nordstrandite or aluminum oxyhydroxides, such as boehmite or diaspore.

Such dehydration is effected by means of a flow-stream of hot gas to very rapidly eliminate and entrain the water evaporated.

The temperature of the gases in the apparatus typically ranges from approximately 400° to 1,200° C., with a contact time of the hydroxide with the hot gases being on the order of a fraction of a second to 4 or 5 seconds.

The alumina produced in this manner may be used as is, or after having been subjected to a treatment to eliminate, in particular, the alkaline values which may be present.

The specific surface area (SBE), measured by the BET method, of the active alumina produced by the rapid dehydration of aluminum hydroxides or oxyhydroxides generally ranges from about 50 to 400 $m^2/g$, with the diameters of the particles generally ranging from 0.1 to 300 microns, preferably from 1 to 120 microns.

Such alumina has a pore volume on the order of 10 to 50 cm³/g, with the pores having dimensions of less than 500 Å.

In the examples given below, an active alumina is used emanating from the rapid dehydration of Bayer hydrate (hydrargillite) which is an industrial aluminum hydroxide readily commercially available and very inexpensive.

Such an active alumina is well known to this art and is described, for example, in FR 1,108,011.

The agglomeration of the active alumina is carried out by methods also well known to this art, such as, for example, by tabletting, extrusion, pelleting in a granulator, etc.

The agglomeration may be carried out using such active alumina as that obtained by dehydration and an optional subsequent treatment, or an active alumina ground to one or more predetermined grain size distributions.

Pore-forming agents may be added to the active alumina prior to or during the agglomeration step to provide a high porosity, in particular of pores having a diameter larger than about 60 nm.

These agglomerates, prior to being subjected to the hydrothermal treatment, may be further processed by different treatments, such as, for example, calcination, aging, etc.

Prior to, or upstream of the hydrothermal treatment, the agglomerates are impregnated with an aqueous solution.

This impregnation may be carried out before placing the agglomerates into the enclosure, or when the agglomerates are already situated in the autoclave.

In the latter case, the impregnating solution is injected through the bed of agglomerates.

In the first case, the impregnation is carried out by any known method, such as impregnation by immersion, in a barrel or in a granulator, for example.

Acid solutions suitable for impregnation according to the invention include, for example, aqueous solutions of nitric, hydrochloric, perchloric or sulfuric acids, or of the weaker acids, such as acetic acid (these solutions have a pH of less than approximately 4), or a mixture of acids. In a preferred embodiment of the invention, aqueous solutions of nitric acid and acetic acid, whether alone or in admixture, are used.

It is also possible to impregnate aged alumina agglomerates with an acid solution and compounds introducing an anion capable of combining with aluminum ions in solution, as described in FR 2,496,631.

Exemplary of such compounds are those containing a nitrate, chloride, sulfate, perchlorate, chloroacetate, dichloroacetate, trichloroacetate, bromoacetate or dibromoacetate anion, or an anion of the general formula:

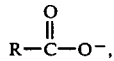

e.g., the formates, acetates, and the like.

According to the present invention, the hydrothermal treatment is carried out at a temperature higher than 80° C., preferably ranging from 150° to 250° C., for a duration of time preferably ranging from 20 min to 36 hours.

In another preferred embodiment of the invention, the temperature of the hydrothermal treatment ranges from 120° C. to 220° C. for a period of time of from 15 min to 18 hours.

This hydrothermal treatment, in particular, permits the conversion of at least a part of the alumina into boehmite. It may advantageously be carried out either under saturated vapor pressure or under a partial vapor pressure at least equal to about 70% of the saturating vapor pressure corresponding to the temperature of the treatment.

The agglomerates treated in this manner are then optionally treated at a temperature ranging from approximately 100° to 200° C. for a period of time sufficient to eliminate the water that is not chemically bonded to the alumina. The agglomerates are then subjected to a heat treatment, also referred to as thermal activation, at a temperature of from 400 to 1,100° C., for a period of time of from 15 min to 2 hours.

The activation temperature is selected as a function of the intended use of the agglomerates. Thus, for application in the field of catalysis for the treatment of the exhaust gases emanating from internal combustion engines, activation at a temperature of approximately 600° to 1,000° C. is preferred.

The invention also features an apparatus for carrying out the above hydrothermal treatment.

This apparatus comprises an autoclave, an enclosure defining a receptacle, or basket, to receive the agglomerates to be treated, said enclosure being placed within the autoclave such as to establish an interspace between at least the major portion of the internal walls of the autoclave and the outside wall members of the basket.

The apparatus also comprises a heat transfer fluid inlet opening into the interspace described above.

Therefore, the heat transfer fluid does not directly contact the agglomerates, as the walls of the basket establish a protective screen.

However in order to improve the heating of the agglomerates, the walls of the receptacle or basket, in a preferred embodiment of the invention, are provided with a plurality of openings, at least over a part of its wall member.

Furthermore, to provide a more homogeneous treatment of the agglomerates, the basket is rotatably mounted within the autoclave, such that the agglomerates are in a state of motion relative to one another.

Advantageously, the axes of symmetry of the autoclave and the basket are identical.

This invention also features the resulting alumina agglomerates, per se, comprising a stacked array of alumina particles obtained by the dehydration of aluminum hydroxide.

These agglomerates have, after a heat treatment or activation at a temperature higher than 400° C., an attrition resistance (AGM) lower than 0.3%, for a total pore volume ranging from 0.55 cm³/g to 1.20 cm³/g or 0.55 to 1.15 cm³/g and a packing or tap density (PD) ranging from 0.400 to 0.700.

Attrition resistance is determined by the following test:

A given volume (60 cm³) of the product to be tested is introduced into a specially designed inverted Erlenmeyer flask connected to a metal inlet orifice.

Onto the flat part (bottom) of the Erlenmeyer flask, a large outlet orifice (2.54 cm) covered with a screen having a 1.168 mm opening, is provided.

Through the inlet orifice, a strong flowstream of nitrogen gas is passed, which has two effects: (1) it circulates and impacts the particles upon each other, which causes wear by friction and (2) it impacts the particles against the upper part of the Erlenmeyer flask, which effects their degradation according to the intensity of the impact.

The product is tested for 5 min and the remaining particles are weighed. The reduction in weight after the test, expressed in % of the initial charge, is designated the percentage of wear by friction (attrition).

Depending on the density of the product, a flow of nitrogen ranging from approximately 99.1 to about 113.2 dm$^3$/min is introduced. The flow of nitrogen must be sufficient such that the particles impact the upper part of the Erlenmayer flask. The fine particles produced by frictional wear are entrained out of the Erlenmeyer flask by the flow of nitrogen, which results in a loss of weight of the product initially introduced.

The following method is used to measure the packing density (PD):

The agglomerates are introduced into a test tube having a predetermined volume. The test tube is vibrated to assure the tapping of the pellets.

After filling and tapping the agglomerates, their surface is leveled off and the weight of the products conditioned in this manner in the test tube is determined.

$$PD = \frac{\text{weight of products}}{\text{volume of test tube}} \text{ in g/cm}^3$$

The total pore volume (Vpt) of the agglomerates is determined by the following formula:

$$Vpt = (f/PD) - (1/E)$$

wherein f is the volume coefficient of packing (for spherical pellets f=0.60±0.04)
PD : packing or tap density;
E : crystalline density of the alumina (ranging from 3 to 3.6 g cm$^3$ for transition crystalline forms).

The total pore volume may also be determined experimentally by impregnating a given weight of agglomerate with water, until the surface of the agglomerates becomes wet and then determining the volume of the water impregnated in this manner.

The alumina agglomerates are also characterized by their grain density (GD) which is equal to:

$$PD = f \, GD$$

wherein f is as defined above.

The grain density (GD) may also be measured by determining the volume occupied by a predetermined weight of alumina by immersing said mass in a predetermined weight of mercury and determining the volume of mercury displaced. To prevent the penetration of mercury into the pores of the alumina, no pressure is applied to the mercury.

The preferred agglomerates of the invention are spherical in shape and are used as catalyst supports in the field of the treatment of gaseous effluents, such as the exhaust gases from internal combustion engines or the smoke from boilers, and in catalytic processes for the treatment of crude oil fractions.

Figure 2:
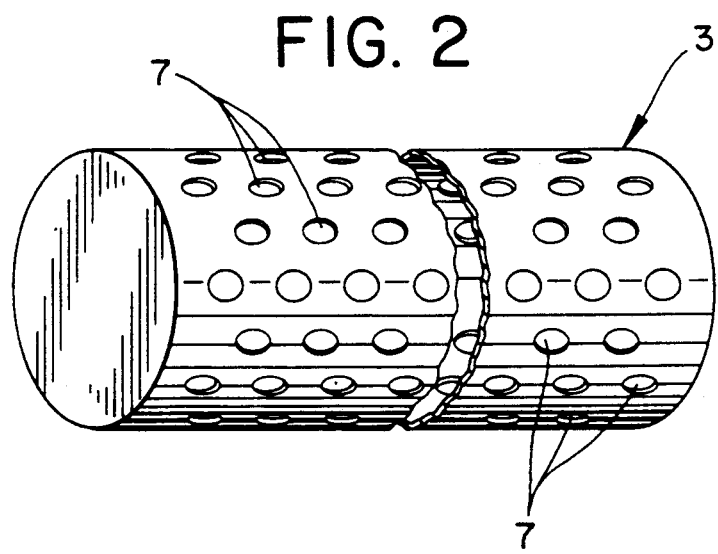
FIG. 2 is an enlarged plan view of the receptacle/basket comprising the apparatus shown in FIG. 1.

With specific reference to FIGS. 1 and 2 of the accompanying Figures of Drawing, one embodiment of suitable apparatus for carrying out the hydrothermal treatment of the invention is illustrated.

The apparatus comprises an autoclave 1 containing, in particular, a manometer 2. The autoclave further includes all of the conventional accessories mounted on this type of apparatus. For the sake of clarity, these different accessories corresponding to the known elements of the invention are not shown.

The apparatus of the invention also contains an internal enclosure 3, constituting a basket or receptacle into which the agglomerates (not shown) to be treated ° re introduced.

This enclosure 3, together with the internal wall surfaces of the autoclave 1, defines an interspace 4.

Into this space 4, a heat transfer fluid, for example a vapor, is introduced, illustrated in FIG. 1 by the pipes 5. However, other feed means may be used, such as, for example, a simple vapor inlet in said space 4. The pipes are connected to a source of the heat transfer fluid, not shown.

The enclosure 3 or basket is cylindrical in the embodiment shown and is maintained in position in the autoclave 1 by the support axles 6. However, it is possible to use other means to support the basket 3 in the autoclave 1 without departing from the scope of the invention.

The cylindrical shape shown for the basket 3 is given merely by way of example. It will of course be appreciated that baskets of any shape may be used according to the invention.

The basket or enclosure 3 may be moved, for example in a rotating motion, by any suitable means, such as an, electric motor, a rack, etc.

The basket 3, in a preferred embodiment of the invention, contains a plurality of openings 7. In the example shown, these openings consist of perforations.

However, such openings may also be, for example, slots, grids distributed over a part of the wall of the enclosure, and the number of which may be arbitrary. Thus, a basket containing two slots permitting the flow of the fluids is also suitable per the present invention.

Finally, the autoclave 1 contains openings of doors to permit installation of the enclosure and its emptying, either by removing the basket and emptying it outside the autoclave, or by emptying the basket inside the autoclave. For the sake of clarity, these openings are not shown in FIG. 1.

The basket 3 contains similar openings to fill and empty it.

The hydrothermal treatment of the alumina agglomerates is carried out by first filling the basket 3 with the alumina aggregates.

The alumina aggregates may be impregnated prior to their introduction into the basket 3 with a hydrotreating solution, i.e., water or an aqueous acid solution.

But it is also possible to place the agglomerates into the basket 3 and feed the hydrotreatment solution into the basket 3 located in the autoclave, either by means of feeder pipes 5 or by a feeder system (not shown) supplying the solution directly into the basket 3.

After closing the autoclave, the water vapor is introduced therein by means of the feeder pipes 5 to establish the saturating vapor pressure and the temperature desired.

These pressures and temperatures are maintained for a predetermined duration, either with or without rotating the basket 3.

The agglomerates treated in this manner are then removed from the autoclave 1 and the basket 3 and are subsequently dried and activated by a heat treatment.

In order to further illustrate the present invention and the advantages thereof, the following specific examples are given, it being understood that same are intended only as illustrative and in nowise limitative

EXAMPLES

Alumina pellets having a diameter of from 2.4 to 4 mm, produced by the agglomeration of alumina obtained by the rapid dehydration of hydrargillite, Examples 1-4 were treated according to the process of the invention.

These pellets had the following properties prior to the hydrothermal treatment:

(i) Specific surface (SBE) : 190 m$^2$/g
(ii) Vpt (total pore volume) : 0.90 cm$^3$/g
(iii) Vmp (micropore volume) 0.45 cm$^3$/g ($\phi < 0.1$ μm)
(iv) VMp (macropore volume) 0.45 cm$^3$/g ($\phi > 0.1$ μm) 0.35 cm$^3$/g ($\phi > 1$ μm)

They were then impregnated by immersion with acid solutions containing acetic acid and nitric acid in proportions such that the impregnated pellets contained 7% by weight acetic acid and from 5% to 17% nitric acid.

These percentages are expressed relative to the weight of the alumina of the pellet.

The pellets were subjected to a hydrothermal treatment by introducing them into the basket 3 and injecting the water vapor through the distribution pieces 5.

The temperature of the treatment was 210° C. for 2.25 hours.

The results are reported in the Table which follows wherein values for specific surface (SBE), packing density (PD), total pore volume (VPT), macropore volume (VMP), micropore volume (Vmp), crushing strength (EGG) and attrition loss (AGM) are given:

TABLE

| Example | % HNO$_3$ | Autoclave | SBE (1) m$^2$/g | SBE (V) (1) m$^2$/g | PD g/cm$^3$ | VPT cm$^3$/g | VMP cm$^3$/g | Vmp cm$^3$/g | EGG kg | AGM % |
|---|---|---|---|---|---|---|---|---|---|---|
| 1 | 4.97 | Static basket | 121 | 62 | 0.42 | 1.146 | 0.34 | 0.70 | 3.08 | 0.2% |
| 2 | 5.12 | Rotating basket | 107 | 75 | 0.426 | 1.126 | 0.369 | 0.748 | 3.54 | 0% |
| 3 | 7.49 | Rotating basket | 111 | 70 | 0.414 | 1.167 | 0.383 | 0.723 | 3.59 | 0% |
| 4 | 16.90 | Rotating basket | 94 | 66 | 0.414 | 1.167 | 0.347 | 0.723 | 3.11 | 0% |
| 5 | 4 | Without basket | 110 | 63 | 0.432 | 1.106 | 0.35 | 0.74 | 2.75 | 1.75% |

(1) measured after aging for 24 hours at 980° C.

These experiments demonstrated, in particular compared with Example 5, that carrying out a hydrothermal treatment according to the invention enables production of pellets having excellent attrition resistance.

The experiments also evidenced that the use of a rotating basket and, thus, the movement of the pellets relative to each other considerably reduces adhesion among the pellets.

Figure 3:
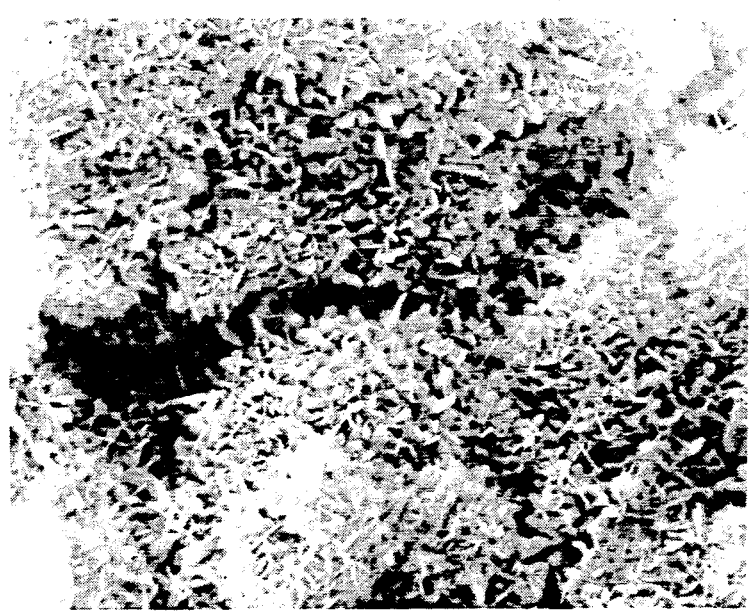
FIG. 3 is a photomicrograph of the active alumina agglomerates of the invention, taken with a scanning electron microscope, at an enlargement of 6,000 X.

FIG. 3 illustrates the structure of the pellets and more particularly the stacking of the alumina particles.

Furthermore, under the conditions employed for the hydrothermal treatment, the boehmite is in the form of needles which create a chestnut burr type structure such as described in EP 98,764 and also shown in FIG. 3.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of attrition resistant agglomerates of active alumina, comprising establishing a batch of starting material active alumina agglomerates in a confining and protective treatment zone, said starting agglomerates having been impregnated with water or an aqueous acid solution and said confining treatment zone itself being enclosed within an autoclaving assembly as to provide an interspace between the internal wall surfaces of said autoclaving assembly and the exterior wall surfaces of said treatment zone, and hydrothermally treating said impregnated agglomerates at a temperature of at least 80° C. by directing a stream of a hot heat transfer fluid against said exterior wall surfaces of said treatment zone.

2. The process as defined by claim 1, said treatment zone being only partially filled with said starting agglomerates.

3. The process as defined by claim 1, said treatment zone being perforated.

4. The process as defined by claim 1, said treatment zone comprising a basket receptacle.

5. The process as defined by claim 1, comprising hydrothermally treating said impregnated agglomerates at a temperature of from 80° to 250° C.

6. The process as defined by claim 5, comprising hydrothermally treating said impregnated agglomerates at a temperature of from 150° to 250° C.

7. The process as defined by claim 1, comprising hydrothermally treating said impregnated agglomerates for from 30 minutes to 36 hours.

8. The process as defined by claim 1, said starting agglomerates having been impregnated with an aqueous acid solution.

9. The process as defined by claim 1, said starting agglomerates having been impregnated with water.

10. The process as defined by claim 8, said aqueous acid solution comprising nitric, hydrochloric or sulfuric acid, or a weak acid.

11. The process as defined by claim 8, said aqueous acid solution further comprising a compound that releases an anion combinable with aluminum ions.

12. The process as defined by claim 11, said compound comprising a nitrate, chloride, sulfate, perchlorate, chloroacetate, bromoacetate, dibromoacetate or carboxylate.

13. The process as defined by claim 1, comprising establishing said starting agglomerates in a state of motion relative to each other.

14. The process as defined by claim 13, comprising rotating said treatment zone for at least a part of the hydrothermal treatment.

15. The process as defined by claim 1, said heat transfer fluid comprising water vapor.

16. The process as defined by claim 1, further comprising heat-activating said hydrothermally treated agglomerates.

17. The process as defined by claim 16, further comprising calcining said heat-activated agglomerates.

18. The process as defined by claim 1, said starting agglomerates comprising dehydrated aluminum hydroxide.

19. The process as defined by claim 4, said treatment zone comprising a perforated basket receptacle.

20. Agglomerated particulates comprising a stacked array of active alumina particles, said agglomerated particulates having a total pore volume ranging form 0.55 to 1.20 $cm^3/g$, a tap density ranging from 0.400 to 0.700 and a resistance to attrition of less than 0.3% after aging for 24 hours at 980° C.

21. The agglomerated particulates as defined by claim 20, essentially spherical in configuration.

22. The agglomerated particulates as defined by claim 20, comprising dehydrated aluminum hydroxide.

23. The agglomerated particulates as defined by claim 20, heat-activated and calcined.

24. The agglomerated particulates as defined by claim 23, comprising a fraction of boehmite.

25. The agglomerated particulates as defined by claim 2, wherein the total pore volume ranges from 0.55 to 1.15 $cm^3/g$.

26. The process as defined by claim 1, wherein said stream of hot heat transfer fluid is introduced into the interspace and does not directly contact said impregnated agglomerates.

27. The process as defined by claim 1, wherein at least one of the wall surfaces of said treatment zone is perforated and said heat transfer fluid comprises water vapor, the process further including forming water by condensation of the water vapor and cascading the water through the agglomerates.

* * * * *